Nov. 25, 1941.                F. H. EHNTS                2,264,072
                          LUBRICATING FITTING
                          Filed Jan. 21, 1941

INVENTOR
Fred Henry Ehnts,
BY
Fraser, Myers & Manley
ATTORNEYS.

Patented Nov. 25, 1941

2,264,072

UNITED STATES PATENT OFFICE 2,264,072

LUBRICATING FITTING

Fred Henry Ehnts, Lansdowne, Pa., assignor to Keystone Lubricating Company, Philadelphia, Pa., a corporation of Pennsylvania Application January 21, 1941, Serial No. 375,191

7 Claims. (Cl. 184—105)

My present invention relates to lubricant fittings and aims to provide certain improvements therein. More particularly it relates to a telltale fitting for giving a visual indication when a ball, roller or plain bearing which is being lubricated with a viscous lubricant through such fitting, has been supplied with an adequate amount of lubricant.

This invention constitutes an improvement upon the fitting disclosed in my prior Patent No. 2,217,737, in Figs. 1 to 4 of which there are disclosed tell-tale low pressure lubricant fittings adapted to be directly connected to the housing of a ball or roller bearing, said fittings having portions thereof projecting a substantial distance outwardly from said housing for connection to a conventional form of high pressure lubricant fitting.

Under certain circumstances it is impracticable and undesirable for the lubricant fitting to project beyond the bearing housing. Hence, my present invention has for its primary object the provision of a tell-tale fitting which can be substantially entirely enclosed within a bearing housing. A further object of my invention is to provide such fitting which can be made to fit in the conventional screw-threaded lubricant fitting receiving opening in a bearing housing. A further object is to provide such fitting which will be simple in construction with no parts subject to becoming dislocated in use and hence foolproof in operation and which can be manufactured and sold at a fair price.

The foregoing and other objects of my invention not specifically enumerated, I accomplish by providing a fitting which preferably consists of an externally screw-threaded tubular casing which is adapted to be completely threaded into a tapped opening in a bearing housing, said casing having fixedly mounted therein a tubular element through which the lubricant is supplied to the bearing. The tubular element is held in spaced relation to the inner wall of the casing throughout a major portion of its length and is formed at its outer end with means for contact engagement with the nozzle of a grease gun and with passages or openings communicating with the internal space between the tubular element and the casing. Preferably the openings in the outer end of the tubular element are provided by slots or kerfs of a character such that they can also serve as engagement means for a tool or screw-driver whereby the fitting can be screwed into and unscrewed from the bearing housing. The invention will be better understood from the detailed description which follows, when considered in conjunction with the accompanying drawing, wherein:

Figure 1:
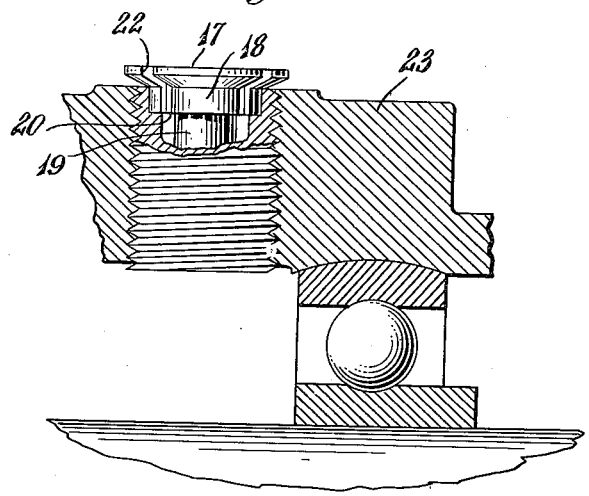
Figure 1 is a section through a portion of a roller bearing housing with my invention, shown partly in section and partly in elevation, applied thereto.
Figure 2:
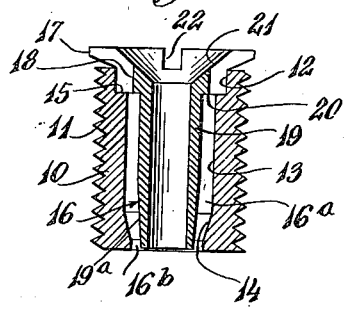
Fig. 2 is a longitudinal section through the lubricant fitting of my invention.
Figure 3:
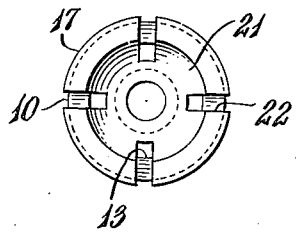
Fig. 3 is a top plan view of the fitting shown in Fig. 2.

Referring to the drawing, the fitting may be said to consist of a tubular casing 10 which is externally screw-threaded throughout its length as indicated at 11 and having a bore therethrough of progressively decreasing diameters from its outer end to its inner end as indicated at 12, 13 and 14. Between the bores 12 and 13 is an internal shoulder 15.

Mounted within the casing 10 is a tubular element 16 which at its top or outer end is formed with an enlarged head herein shown as consisting of an integral flange 17 and a portion 18. Inwardly from the flange 17 the tubular element has portions 18 and 19 of different external diameters between which is a shoulder 20, the inner end of the portion 19 being tapered as indicated at 19a. The overall length of the tubular element 16 is substantially equal to or but slightly greater than the length of the casing 10, with the length of the portion 18 equal to the length of the bore 12, and with the length of the portions 19 and 19a substantially equal to the length of the bores 13 and 14. The diameter of the flange 17 is substantially equal to the diameter of the casing 10; the diameter of portion 18 slightly greater than the diameter of bore 12 and the diameters of the portions 19 and 19a substantially less than the diameters of the bores 13 and 14, respectively. The tubular element is preferably held within the casing by having the portion 18 of the tubular element force-fitted into the bore 12 with the shoulder 20 seating on the shoulder 15 and the flange 17 seating in overlying relation on the outer end of the casing and with the portions 19 and 19a disposed in spaced relation to the walls of the bores 13 and 14 to provide annular spaces 16a and 16b. Preferably, the outer face of the flange is formed with a central concave or conical recess 21 leading outwardly from the bore in the tubular element to provide a seating surface for engagement with the nozzle end of a grease-gun. The enlarged head or the flange and portion 18 of the tubular element are also formed with radial slots or kerfs 22 of a length and depth such that they serve the dual purposes of establishing communicating passages between the annular space 16a within the fitting and the exterior of the fitting, and of providing means for the engagement of a tool or screw-driver whereby the fitting can be screwed into and removed from a bearing housing. The character of the casing 10 is such that it is adapted to be threaded completely into the conventional screw-threaded lubricant receiving fitting opening in a roller bearing or the like housing 23, so that the outer end of the fitting will lie substantially flush with the outer face of the housing.

For charging with viscous lubricant, a bearing housing provided with the fitting of the present invention, the nozzle end of a grease-gun is held in engagement with the conical recess 21 and the grease under pressure forced through the tubular element 16 into the bearing housing. When the viscous lubricant which has been charged into the housing has reached a predetermined amount and has built up a predetermined back pressure governed by the calibration of the cross-sectional area of the annular space 16b at the inner end of the fitting, the back pressure built up by said lubricant will cause the lubricant to flow backwardly or outwardly into the annular chamber 16a and out through the radial slots 22 to provide a visible tell-tale, indicating that the bearing has been adequately charged with lubricant. As more fully described in my prior patent above referred to, by varying the area of the opening 16b at the inner end of the annular space 16a, the back pressure at which the lubricant will provide a tell-tale can be controlled.

From the foregoing detailed description it will be apparent that I have devised a simple and practicable fitting which can be mounted in a bearing housing to lie flush with the outer face thereof, for insuring adequate lubrication of the ball or roller bearings and guarding against overcharging such bearings with lubricant, and while I have shown and described but a single embodiment of my invention, it is to be understood that I do not wish to be limited to the specific details of construction disclosed, since the same may be varied within the range of engineering skill without departing from the spirit of my invention as hereinafter claimed.

What I claim is:

1. A tell-tale fitting for indicating when a predetermined amount of viscous lubricant has been supplied to a bearing housing, comprising a hollow casing having a bore therethrough, a tubular element mounted within the bore of said casing, said tubular element at its outer end substantially filling the bore of the casing and being substantially coextensive with the outer end of the casing and inwardly of said outer end being of reduced diameter and providing an annular space between said tubular element and the wall of the casing bore, and said outer end of the tubular element having openings therethrough communicating with the annular space.

2. A tell-tale fitting for indicating when a predetermined amount of viscous lubricant has been supplied to a bearing housing, comprising a casing having a bore therethrough, a tubular element mounted within the bore of said casing, said tubular element at its outer end substantially filling the bore of the casing and being substantially coextensive with the outer end of the casing and having an outer surface adapted for engagement with a lubricant supply means, said tubular element extending from one end of the casing to the other and having a part inwardly of said outer end of reduced diameter and providing an annular space between said part and the wall of the casing bore and said outer end of the tubular element having openings therethrough communicating with said annular space.

3. A lubricant fitting having external threads whereby to attach said fitting within a threaded opening in a bearing housing, said fitting having a lubricant supply passage extending therethrough, a concave surface at the outer end of the fitting leading from said passage adapted for engagement with a lubricant supply means and a second passage leading from the outer end of the fitting to the inner end thereof, the outer end of said second passage being provided by a radial slot in the top of the fitting, which slot also provides a means for engagement of a tool or screw-driver whereby the fitting can be screwed into and removed from the housing.

4. A lubricant fitting comprising a hollow externally threaded casing adapted to substantially entirely engage within a screw-threaded opening in a bearing housing, said casing below its outer end having an internal annular shoulder, a tubular element of substantially the same length as the casing having an external annular shoulder adjacent its outer end and an annular flange at its outer end of substantially the same diameter as the casing, said tubular element being fixedly mounted within the casing with the shoulder on the tubular element seating on the shoulder within the casing and the flange on the tubular element overlying the outer end of the casing and providing an annular space between the tubular element and the casing below the seating shoulders of said respective parts, the outer face of the flange on the tubular element having a concave surface leading away from the bore and adapted for engagement with a lubricant supply means and the flange of the tubular element having a radial slot therein establishing a free passage between the annular space and the exterior of the fitting and providing a means for the engagement of a tool or screw-driver whereby the fitting can be screwed into and removed from the housing.

5. A lubricant fitting comprising a tubular casing adapted for attachment to a bearing housing and having below its outer end an internal annular shoulder and a tubular element of approximately the same length as the casing having an enlarged head, said tubular element being fixedly mounted within and substantially co-extensive with the casing and with the enlarged head seating on the shoulder within the casing and providing an annular space between the tubular element and the casing below the head, the head ono the tubular element having a surface communicating with the bore of the tubular element for engagement with a lubricant supply means and also having an opening therein independent of the bore establishing an unobstructed passage between the annular space and the exterior of the head.

6. In combination, a bearing housing and a lubricant fitting attached to and substantially entirely enclosed within said bearing housing with the outer end of said fitting lying substantially flush with the outer surface of the surrounding portion of said housing, said lubricant fitting having a lubricant supply passage extending from the outer end to the inner end of the fitting, a surface at the outer end of the lubricant supply passage adapted for engagement with a lubricant supply means and said fitting having a second unobstructed passage spaced from the supply passage and extending from the outer end of the fitting to the inner end thereof.

7. In combination, a bearing housing and a lubricant fitting attached to and substantially entirely enclosed within said bearing housing with the outer end of said fitting lying substantially flush with the outer surface of the surrounding portion of said housing, said lubricant fitting comprising a hollow casing having below its outer end an internal annular shoulder and a tubular element of approximately the same length as the casing having an enlarged head, said tubular element being fixedly mounted within and substantially co-extensive with the casing and with the enlarged head seating on the shoulder within the casing and providing an annular space between the tubular element and the casing below the head, the head on the tubular element lying substantially flush with the surrounding portion of the housing and having a surface communicating with the bore of the tubular element and adapted for engagement with a lubricant supply means and the head ono the tubular element also having an opening therein independent of the bore establishing an unobstructed passage between the annular space and the exterior of the head.

FRED HENRY EHNTS.